G. S. WASHBURN.
TILTABLE VEHICLE.
APPLICATION FILED AUG. 20, 1917.
1,285,851.
Patented Nov. 26, 1918.
2 SHEETS—SHEET 1.
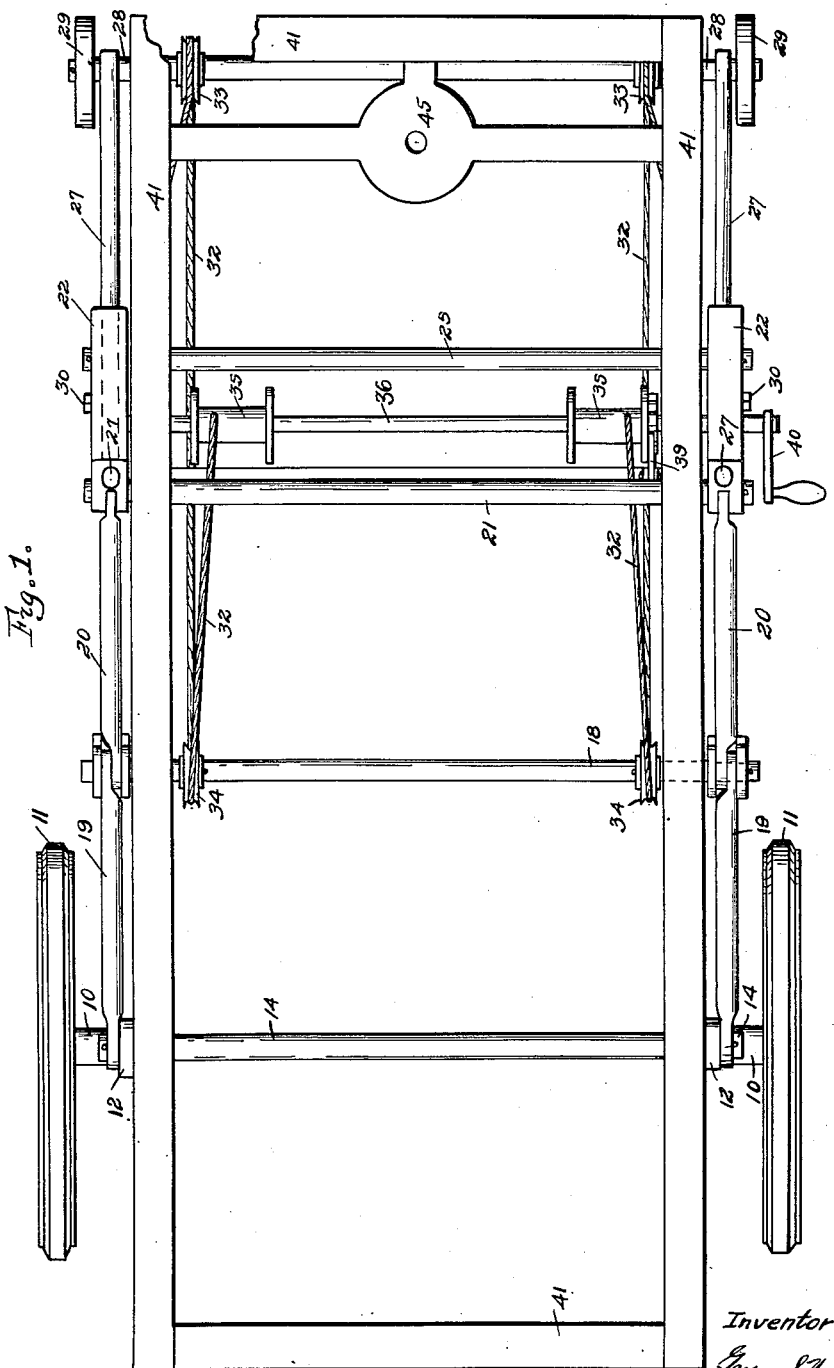

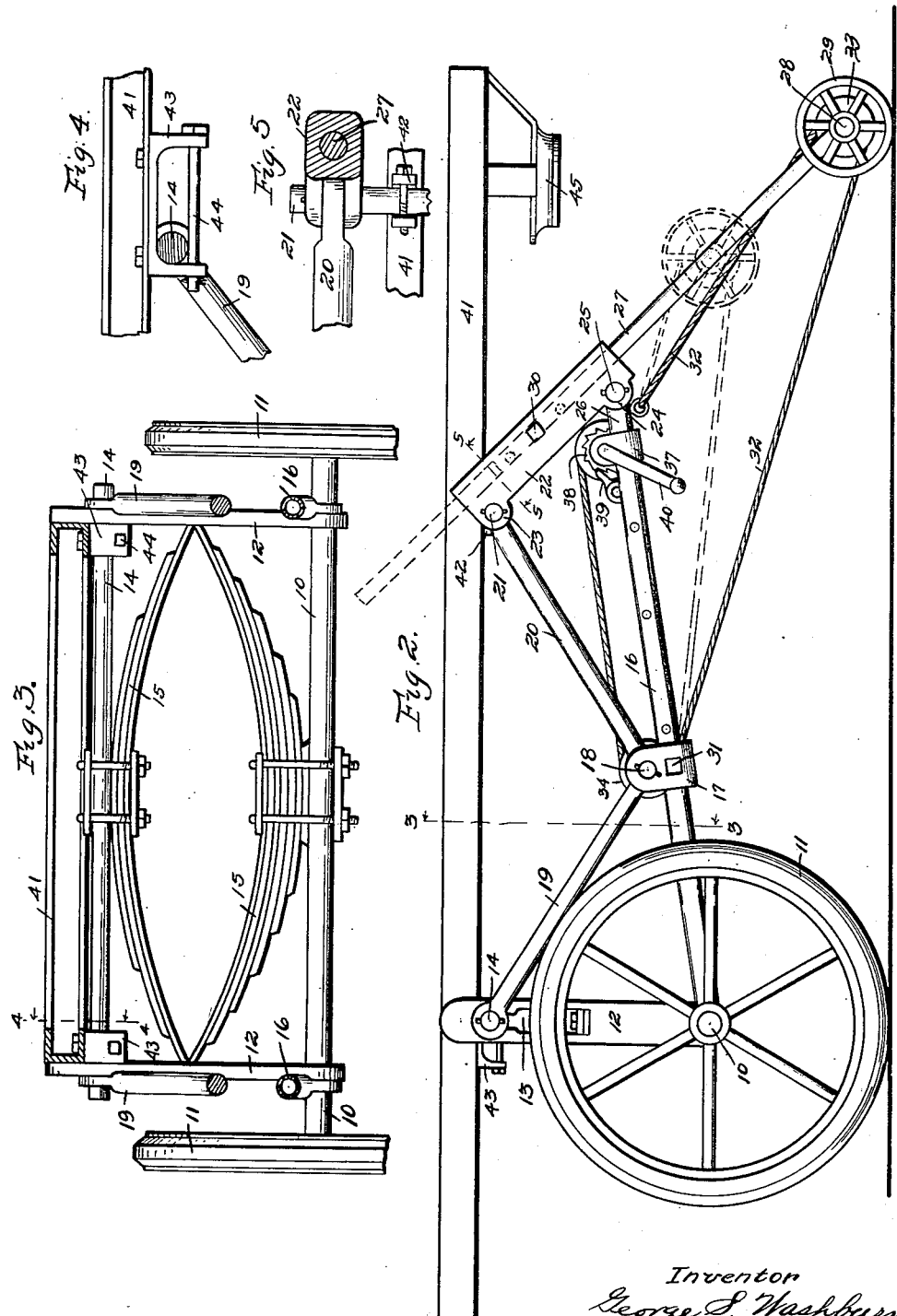

UNITED STATES PATENT OFFICE.

GEORGE SHELDON WASHBURN, OF BLAIRSTOWN, IOWA.

TILTABLE VEHICLE.

1,285,851.          Specification of Letters Patent.     Patented Nov. 26, 1918.

Application filed August 20, 1917. Serial No. 187,163.

*To all whom it may concern:*

Be it known that I, GEORGE SHELDON WASHBURN, a citizen of the United States, and resident of Blairstown, in the county of Benton and State of Iowa, have invented a certain new and useful Tiltable Vehicle, of which the following is a specification.

The object of my invention is to provide a tiltable vehicle of simple, durable and inexpensive construction.

More particularly it is my object to provide a vehicle comprising a frame mounted on wheels, and having a bed or other means for supporting a load, and having also means for adjusting said frame for tilting said load holding means.

With these and other objects in view, my invention consists in the construction, arrangement and combination of the various parts of the device, whereby the objects contemplated are attained, as hereinafter more fully set forth, pointed out in my claims, and illustrated in the accompanying drawings, in which:

Figure 1 shows a top or plan view of a tiltable vehicle embodying my invention.

Fig. 2 shows a side elevation of the same.

Fig. 3 shows a transverse, vertical, sectional view, taken on the line 3—3 of Fig. 2.

Fig. 4 shows a vertical, sectional view, taken on the line 4—4 of Fig. 3, and

Fig. 5 shows a sectional view, taken on the line 5—5 of Fig. 2.

In the accompanying drawings I have used the reference numeral 10 to indicate generally the rear axle of my improved tiltable vehicle. On the ends of the axle 10 are mounted suitable wheels 11.

Pivotally supported on the axle 10 are spaced, upwardly extending frame members 12, having at their upper ends opposite registering openings 13 which are vertically elongated. Extending through the openings 13 is a transverse shaft 14, the central portion of which rests upon a spring 15. In this connection, it may be mentioned that it is not my intention to limit myself to the form or location of the spring 15, insomuch as various means for yieldably mounting the wagon bed or the like might be provided without in any way departing from the essential spirit of my invention.

Fixed with relation to the uprights 12 and extending forwardly therefrom, are frame members 16. Slidably mounted on the frame members 16 between the ends thereof, are bearing blocks 17 which support a transverse shaft 18. Pivotally mounted on the ends of the shaft 14 are frame members 19 which extend normally downwardly and forwardly and are pivoted on the shaft 18. Pivoted to the shaft 18 are frame members 20 which extend normally upwardly and forwardly in the machine parallel with each other, as shown in Figs. 1 and 2.

The form of my invention particularly illustrated in the drawings is designed to be used as a truck attachment. In the form of the invention thus shown, specially designed for such an attachment, the upper forward ends of the frame members 20 are pivotally connected with a transverse shaft 21. At the forward end of the frame members 20 there are downwardly and forwardly extending sleeves or housings 22, which are provided with ears 23 in which the shaft 21 is received to permit pivotal movement of said housings 22. Near the lower end of each housing 22 are similar ears 24 which receive the ends of another transverse shaft 25.

Pivoted to the transverse shaft 25 are rearwardly extending shafts or the like 26, which are slidably received in the frame members 16, which frame members 16 are hollow to permit the telescopic adjustment of the members 16 and 26.

The housings or sleeves 22 receive shafts 27 which normally extend downwardly and forwardly, as illustrated in Fig. 2, and at their lower ends support a transverse shaft 28 on which are wheels 29. The housings 22 are provided with set screws 30, whereby the shafts 27 may be fixed at any position in said housings.

In this connection, it may be mentioned that the bearing blocks 17 are slidably mounted on the frame members 16 and may be locked in different positions on said frame members by means of the set screws 31.

Secured at some suitable point, as for instance, to the forward ends of the shafts 26, are flexible devices 32 which extend downwardly around pulleys 33 on the shaft 28, thence upwardly and rearwardly around pulleys 34 on the shaft 18, and thence forwardly in the machine to drum 35 mounted on the transverse shaft 36, rotatably supported on the forward ends of the frame members 16 in bearings 37. On the shaft 36 is a ratchet wheel 38. Suitably mounted is a pivoted pawl 39, adapted to coact with the ratchet wheel 38. On the shaft 36 is a crank 40.

Supported on the device hereinbefore described is a frame 41 which may be of any shape or kind. The frame 41 is mounted by means of bearings or brackets 42 on the shaft 21, so as to permit the pivotal movement of the frame with relation to said shaft 21. The rear end portion of the frame 41 is supported upon downwardly extending yokes 43 which are elongated longitudinally of the machine and which receive the transverse shaft 14. For holding the shaft 14 in the yokes 43 the lower ends of the arms of said yokes are connected by means of bolts 44, which are readily removable.

On the under side of the forward end of the frame 41 is a suitable device 45 for connecting the machine here shown with the rear end of an automobile truck or the like.

My improved device may be used in a great variety of ways. For instance, by making the wheels 29 of proper size, the entire device may be used as a wagon having the tiltable frame or bed supporting means 41.

In the illustration shown, I have designed the device for use as an attachment for a motor truck, and when so used the operation of the device is substantially as follows: In Fig. 2 I have shown the device in its ordinary position. It will, of course, be understood that the device 45 will be supported on and connected with the rear end of such a truck as I have mentioned. Assuming now that it is desirable to disconnect my improved device as herein shown, from such a truck, then the user of the device operates the crank arm 40 for rotating the shaft 36 and winding on the drums or the like 35 the flexible members 32. The result of such operation would be to tend to draw the shaft 28 rearwardly and to move the shaft 18 correspondingly forwardly. Insomuch as the load is on the frame 41, the operation of the device will be to swing the frame members 19 and 20 forwardly with relation to the frame members 16, so that what actually happens is that the axle 10 is moved slightly rearwardly, and as the operation continues the forward end of the frame 41 is tilted upwardly while the rearward end of said frame is permitted to tilt downwardly. That is to say, the wheels 29 and 11 tend to move rearwardly with relation to the frame 41, or to the same effect, the frame 41 tends to move forwardly with relation to said wheels, and at the same time the front end of the frame is tilted upwardly and the rear end is tilted downwardly somewhat. The degree of operation of the crank 40 determines the amount of tilting imparted to the frame 41.

If it is simply desired to lift the member 45 off the truck and leave the load on the frame 41, the forward end of the frame 41 is lifted only enough to release my improved device, as herein shown, from the truck.

If it is desired to use the device for dumping purposes, the operation is simply continued until the full tilting operation of the frame 41 has been completed. Nothing is necessary to restore the frame 41 to its horizontal position except to release the pawl 39 and permit the flexible device or rope 32 to unwind from the drums 35.

It will be noted that a slight sliding movement of the frame 41 with relation to the shaft 14 is provided for by means of the yokes 43. This permits the movement of the frame 41 on the spring 15 without undue strain on the other parts.

If it is desired to lift the frame 41, which might represent a wagon bed, a hay rack or any such device, and to retain it in horizontal position, it will be understood that the forward end of such frame is secured by means of a chain or otherwise, to the ground or any fixed object, and the bolt 44 is removed, and thereupon when the crank 40 is operated, it will be seen that the shaft 21 will be raised for raising the entire frame 41. The brackets 42 are made readily detachable, so that the frame 41 may be taken off the rest of the device and other frames substituted therefor.

It will be obvious that my device has a number of advantages, some of which may be seen from the foregoing description of its construction and operation.

The device may be used as a complete unit as a dump wagon or the like, or may be used as herein more especially described, as an attachment for trucks. Where the device is used as an attachment for trucks, two or more of the devices may be used with a single truck, and may be readily and easily disconnected from the truck for being permitted to stand and support a load or for dumping a load from the frame 41.

I have shown in the drawings herewith simply one form of my improved device, and it is my intention to cover by the claims of the patent to be issued on this application, any modified form of structure or use of mechanical equivalents which may be reasonably included within the scope of such claims.

I claim as my invention:

1. In a device of the class described, an axle, wheels thereon, frame members pivoted with relation to said axle, and extending forwardly therefrom, frame members pivoted to said axle and extending upwardly therefrom, bearing blocks slidably mounted on said first frame members, a transverse shaft carried by said bearing blocks, frame members, comprising pairs of members pivoted to said shaft, the members of each pair extending respectively upwardly and forwardly, and upwardly and rearwardly, a shaft pivotally mounted on said rearwardly extending members and pivotally connected with said first named upwardly extending members, a sleeve member pivoted to the upper forward end of each of said forwardly extending members, and telescopically connected with said first described frame members, shafts slidably mounted in said sleeve members, means for fixing said last named shafts in various positions in said sleeve members, wheels supported at the lower ends of said last named shafts, and means for drawing said last named wheels and said bearing blocks toward each other.

2. In a device of the class described, a frame, an axle thereon, wheels for supporting said axle, a second axle, wheels on said second axle, a load carrying member, means supported on said second axle and extending to said load carrying member, a rigid member interposed between said first axle and said last named means, and means for drawing said second axle toward said first axle, for raising said load carrying means.

3. In a device of the class described, an axle, wheels supported thereon, a second axle, wheels on said second axle, a load carrying means, means interposed between said first axle and said load carrying means, means interposed between said second axle and said load carrying means, a rigid member connected with said first axle and pivoted to said last means, a member slidably mounted on said rigid member, arms pivotally mounted with relation to said slidably mounted member, said arms being connected respectively with the upper ends of said first and second means, and means for drawing said second axle toward said slidable member for raising said load carrying means.

4. In a device of the class described, an axle, wheels supported thereon, a second axle, wheels on said second axle, a load carrying means, means interposed between said first axle and said load carrying means, means interposed between said second axle and said load carrying means, a rigid member connected with said first axle and pivoted to said last means, a member slidably mounted on said rigid member, arms pivotally mounted with relation to said slidably mounted member, said arms being connected respectively with the upper ends of said first and second means, and means for swinging said second means pivotally on said rigid member.

Des Moines, Iowa, August 14, 1917.

GEORGE SHELDON WASHBURN.